United States Patent
Bolla et al.

[11] Patent Number: 5,327,093
[45] Date of Patent: Jul. 5, 1994

[54] METHOD AND SYSTEM FOR SYNCHRONIZING MUTUALLY INTERFERING SIGNALS IN DIGITAL RADIO TRANSMISSIONS WITH FREQUENCY RE-USE

[75] Inventors: Maurizio Bolla, Milan; Leonardo Rossi, Piacenza; Arnaldo Spalvieri, Senigallia, all of Italy

[73] Assignee: Alcatel Italia S.p.A., Milan, Italy

[21] Appl. No.: 6,805

[22] Filed: Jan. 21, 1993

[30] Foreign Application Priority Data

Jan. 22, 1992 [IT] Italy .............................. MI92A000110

[51] Int. Cl.$^5$ ......................... H03D 3/00; H03L 7/07; H04B 1/12; H04B 7/10
[52] U.S. Cl. ......................... 329/308; 331/12; 342/362; 455/295
[58] Field of Search ............ 329/300, 302, 304, 306, 329/307, 308, 311, 315, 318, 319, 320, 321, 323, 324, 325, 345, 346, 349, 350, 351, 352, 353, 358, 360; 342/361, 362, 363, 364, 365, 366; 455/295, 296

[56] References Cited

U.S. PATENT DOCUMENTS

| | | | |
|---|---|---|---|
| 4,112,370 | 9/1978 | Monsen | 342/361 X |
| 4,660,045 | 4/1987 | Clark | 342/361 |
| 4,757,319 | 7/1988 | Lankl | 342/361 X |
| 4,942,592 | 7/1990 | Leitch et al. | 329/300 X |
| 5,065,411 | 4/1991 | Muto . | |

FOREIGN PATENT DOCUMENTS 3406621 5/1985 Fed. Rep. of Germany .

Primary Examiner—David Mis
Attorney, Agent, or Firm—Ware, Fressola, Van Der Sluys & Adolphson

[57] ABSTRACT

The present invention concerns a method and a system for demodulating mutually interfering signals according to a suitable synchronism bond between said signals. With such a system a complete decoupling of the demodulators of said signals is obtained. The system is characterized in that on each polarization there is at least a pair of demodulators, a first pair operate a baseband conversion of both signal H and V using the carrier recovery circuit driven by data of one of the two signals (e.g. V) and a second pair operate still a baseband conversion of both signals H and V but using said carrier recovery circuit now driven by data of the other signal (e.g. H).

5 Claims, 2 Drawing Sheets

METHOD AND SYSTEM FOR SYNCHRONIZING MUTUALLY INTERFERING SIGNALS IN DIGITAL RADIO TRANSMISSIONS WITH FREQUENCY RE-USE

TECHNICAL FIELD

The present invention relates to a system for demodulating mutually interfering (H and V) radio signals in which system a demodulator, a cancellation circuit, an equalizer, a carrier recovery circuit and a decision circuit are used on each polarization.

In particular the invention relates to a system for demodulating mutually interfering signals in digital radio transmissions with frequency re-use.

BACKGROUND OF THE INVENTION

In microwave radio link digital transmission there is the need of increasing, as far as possible, the information transmitted per unit of occupied band.

The microwave transmission is typically carried out by transmitting two distinct signals on two right-angled "polarizations" of the electromagnetic field, hereinafter indicated by H and V.

Because of the non-ideal nature of the hardware and transmissive medium, signals H and V tend to interfere with each other considerably.

There are two conventional ways for making negligible the effects of such interference.

The first way consists in transmitting signals H and V on bands which are only partially overlapped, as indicated in FIG. 1.

In this way the portion of (e.g.) signal H which really interferes with V is small and the interference is tolerable. The interference zones are comprised between points I1-I2, I3-I4, etc.

The more efficient second way consists in the so-called re-use of frequency. In this instance the channeling of signals H and V may be represented as in FIG. 2, from which it appears that the transmissive capacity is doubled with respect to FIG. 1, but the two overlapped spectra (e.g. H1 and V1, H2 and V2, etc.) interfere completely.

In this instance the interference of (e.g.) H on V is much more sensible and is opposed through a suitable cancellation circuit which allows the cancellation of the interference itself.

The operation principle of the cancellation circuit, e.g., cancellation of the interference of H on V, is well known: the receiver of the V signal has also the received H signal; the cancellation circuit processes the H signal in such a way as to obtain a replica Hr which is as true as possible to said interference of H present on V.

The cancellation effect is obtained by subtracting the replica Hr (processed by the cancellation circuit) from signal V.

The usual hardware implementation of this system contemplates that receiver of V signal has at its disposal the received H signal downstream of the demodulator of H itself.

What has been described up to now is also true if V is replaced by H and H is replaced by V.

One of the drawbacks arising from the use of such a system is that when one of the two demodulators does not operate correctly (because of failure, adverse propagation or any other reason), the other receiver does not have the signal necessary for cancellation and, therefore, it is subjected to a sensible, no longer cancelable interference. In other words, if one of the demodulators fails, it not only loses its useful signal (e.g. H) but, worse still, it eliminates the possibility of operation also from the second demodulator (e.g. V). After all, one has the complete loss both of H and V, i.e. of all transmission on that carrier.

SUMMARY OF THE INVENTION

It is an object of the present invention to provide a system for synchronizing the received signals H and V in such a way as to allow the correct operation of the cancellation circuit irrespectively of the operation of the demodulator which processes the signal on the other polarization.

By means of the system according to the invention the malfunction of one of the two demodulators does not compromise the operation of the cancellation circuit of the other demodulator.

According to the present invention, independent paths are provided for horizontal (H) and vertical (V) signals.

In further accord with the present invention, at least a pair of demodulators are on each polarization, a first pair operates by converting in base band both H and V signals using said carrier recovery circuit driven through data of one of the two signals (e.g. V), a second pair operates by converting still in base band both H and V signals but using said carrier recovery circuit now driven by data of the other signal (e.g. H).

Another remarkable feature of the invention is that mutually interfering signals are those used in digital radio transmission with re-use of the carrier frequency.

In any case, the different aspects and advantages of the invention will become more apparent from the description of the general solution in combination with a preferred but not limiting embodiment thereof.

BEST MODE FOR CARRYING OUT THE INVENTION

The solution according to the invention is based on the use of a critical combination of demodulators (e.g. four instead of two) such that, maintaining unchanged all the other functions (e.g. a sole carrier recovery circuit, a sole adaptive equalization circuit, a sole cancellation circuit for the interfering signal, a sole decision circuit for data, etc.), one succeeds in realizing the complete independence of a cancellation circuit operation (e.g. the one of V) with respect to the other cancellation circuit (e.g. the one of H) when one of the two is subjected to a damage or a failure.

According to an advantageous aspect of the invention, the two signals V and H are now translated from radio frequency RF to intermediate frequency IF by using a sole local oscillator. The two IF signals are then provided to the demodulator pairs of said critical combination, which in the preferred case is just two (which corresponds to a total of four demodulators).

The first pair of demodulators operate by operating a baseband conversion of both signals H and V using the carrier recovery circuit driven by data of one of the two signals, e.g. V.

The second pair of demodulators act according to the same principle but is driven by data of the other signal, e.g. H.

The two demodulators driven e.g. by the carrier recovery circuit driven in turn by data V, provide two baseband signals V and H which are subsequently processed as described previously as far as the cancellation of the interference produced by H on V is reached.

In this way the loss of H data (e.g. for unfavorable propagation) in no way affects the features of V data receiver, since the demodulator of H signal that is used for the cancellation of the interference of H on V is driven by V data.

The same is true for the receiver driven by H data.

Figure 1:
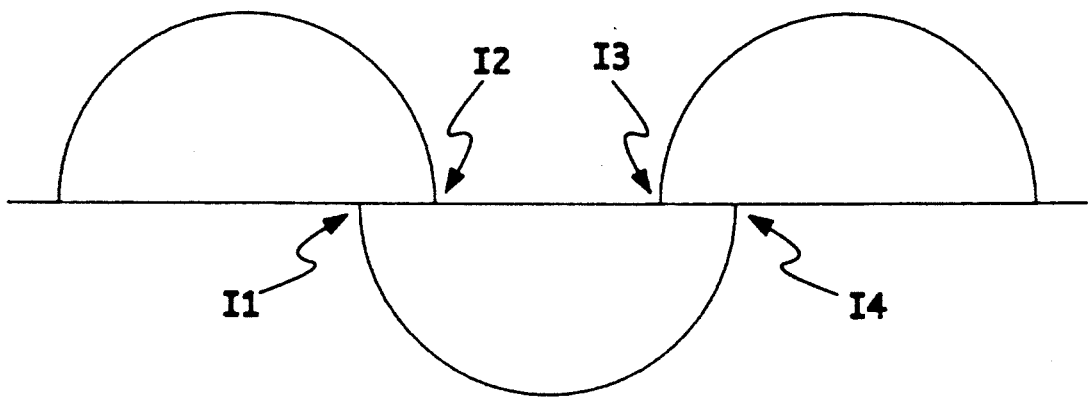
FIG. 1 shows transmitting H and V on bands which are only partially overlapped.
Figure 2:
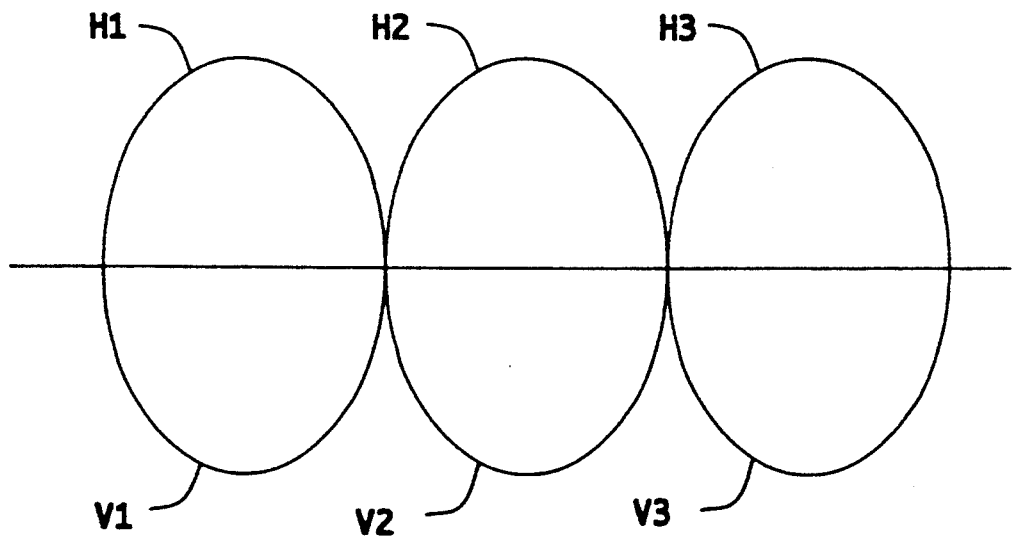
FIG. 2 shows channeling of signals H and V where the two overlapped spectra interfere completely.
Figure 3:
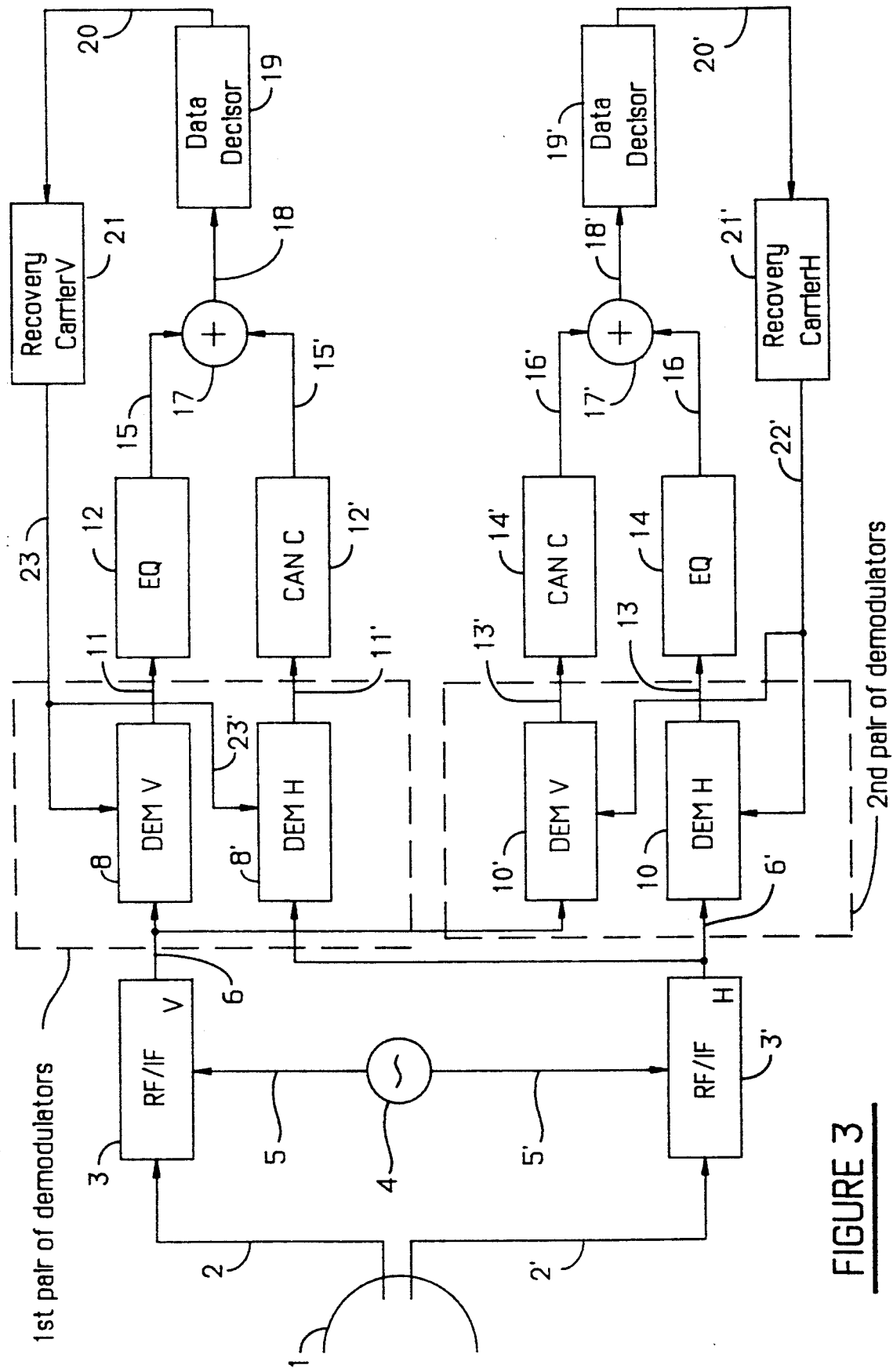
FIG. 3 shows an apparatus, according to the present invention.

The block diagram of a complete receiver in a non-limiting embodiment of the present invention is illustrated in FIG. 3.

Therein two signals H and V received by antenna 1 on the two orthogonal polarizations are applied through lines 2, 2' to RF/IF sections indicated by numeral references 3, 3'.

According to a first aspect of the invention such RF/IF sections are driven of a sole RF local oscillator 4 through lines 5, 5'.

The signals at the outputs of section 3 and 3' on lines 6 and 6' and are respectively demodulated by demodulators 8 and 8' and also by demodulators 10' and 10, respectively.

The output of demodulator 8 is fed through line 11 to the equalizer 12, while the output of demodulator 8' is fed to cancellation circuit 12' through line 11'.

Likewise the output of demodulator 10 is fed to the equalizer 14 on a line 13, while the output of the demodulator 10' is fed to the cancellation circuit 14' on a line 13'.

The outputs of equalizer 12 and cancellation circuit 12' are fed respectively through lines 15 and 15' to the summing node 17, whose output is fed through line 18 to the decision circuit 19 of V data.

Likewise, the outputs of equalizer 14 and cancellation circuit 14' are fed respectively through lines 16 and 16' to the summing node 17' whose output is fed through line 18' to the decision circuit 19' of data H.

Data decided by decision circuit 19 are applied through line 20 to the V carrier recovery 21 which, through line 23 drives demodulators 8 and 8'.

Similarly, data decided by the decision circuit 19' are applied through line 20' to the H carrier recovery 21' which, through line 22', drives demodulators 10 and 10'.

The invention is applicable in all transmissions in which there is interference, and it is susceptible to modifications, variations, replacements and the like, which being apparent to those skilled in the art, naturally fall within the sphere and in the spirit of the invention.

We claim:

1. System for demodulating mutually interfering (H and V) radio signal, in which system on each polarization there are used a demodulator, a cancellation circuit, an equalizer, a carrier recovery circuit and a decision circuit, wherein on each polarization there are at least a pair of demodulators, a first pair thereof operate a baseband conversion of both signals H and V using said carrier recovery circuit driven through data of one of the two signals (e.g. V), a second pair thereof operate a baseband conversion of both signals H and V too, but using said carrier recovery circuit now driven by data of the other signal (e.g. H).

2. System according to claim 1, wherein mutually interfering signals are those used in digital radio transmission with re-use of the carrier frequency.

3. Apparatus, comprising:
   first and second intermediate frequency circuits (3, 3'), each responsive to an oscillator 4 and to a radio frequency signal having polarized components, for providing first and second intermediate frequency signals (6, 6'), respectively;
   first and second demodulators (8, 8'), respectively responsive to the first and second intermediate frequency signals (6, 6') and to a first recovered signal (23), for providing first and second demodulated signals (11, 11'), respectively;
   a first equalizer (12), responsive to the first demodulated signal (11), for providing a first equalized signal (15);
   a first cancellation unit (12'), responsive to the second demodulated signal (11'), for providing a first cancelled signal (15');
   a first summer (18), responsive to the first equalized signal (15) and to the first cancelled signal (15'), for providing a first summed signal (18);
   a first decision circuit (20), responsive to the first summed signal (18), for providing a first decided data signal (20);
   a first carrier recovery circuit (21), responsive to the first decided data signal (20), for providing the first recovered signal (23);
   third and fourth demodulators (10', 10), respectively responsive to the first and second intermediate frequency signals (6, 6') and to a second recovered signal (22'), for providing third and fourth demodulated signals (13', 13), respectively;
   a second cancellation circuit (14'), responsive to the third demodulated signal (13'), for providing a second cancelled signal (16');
   a second equalizer (14), responsive to the fourth demodulated signal (13), for providing a second equalized signal (16);
   a second summer (17'), responsive to the second cancellation signal (16') and to the second equalized signal (16), for providing a second summed signal (18');
   a second decision circuit (19'), responsive to the second summed signal (18'), for providing a second decided data signal (20'); and
   a second carrier recovery circuit (21'), responsive to the second decided data signal (20'), for providing the second recovered signal (22').

4. An improved method for demodulating mutually interfering (H and V) radio signals, where demodulation, cancellation, equalization, recovery and decision making steps are made with respect to each polarization, wherein the improved method further comprises the steps of:
   providing a first dual demodulation step for each polarization for providing baseband conversion of both signals H and V using carrier recovery steps driven through data of one of the two signals H and V; and
   providing a second dual demodulation step for each polarization for providing baseband conversion of both signals H and V also, but using said carrier recovery steps driven by data of another one of the signals H and V.

5. A method according to claim 4, wherein mutually interfering signals are those used in digital radio transmission with re-use of the carrier frequency.

* * * * *